Patented Nov. 8, 1938

2,135,626

UNITED STATES PATENT OFFICE 2,135,626

ABRASIVE ARTICLE AND METHOD OF MANUFACTURING THE SAME

Norman P. Robie, Niagara Falls, N. Y., assignor to The Carborundum Company, Niagara Falls, N. Y., a corporation of Delaware No Drawing. Application February 2, 1937, Serial No. 123,728

4 Claims. (Cl. 51—278)

This invention relates to improved abrasive articles and methods of manufacturing the same. More specifically, the invention is concerned with abrasive or polishing articles consisting of a mass of a bonding material containing finely divided abrasive or polishing particles.

Bonded abrasive products, as typified by abrasive wheels and distinguished from coated abrasive products such as are commonly referred to as "sandpaper", may be divided into two general classes. One of these classes comprises the ordinary grinding wheel, the primary function of which is to remove material quantities of the work being treated, while the other subdivision includes polishing articles, the primary purpose of which is to develop finish while the removal of material is a secondary consideration. Articles of the first class are usually rather porous in character to provide clearance spaces for the material which has been abraded and to assist breakdown of the article in use as the abrasive particles on the surface of the article become dulled. Polishing articles, on the other hand, are comparatively dense and may, in effect, be considered as a mass of bonding material containing abrading or polishing particles embedded therein.

The present invention is concerned with improved articles of this second class and methods of making such articles, which contain finely subdivided abrasive or polishing particles and to methods of manufacturing such articles.

It is accordingly an object of the invention to provide improved abrasive or polishing articles consisting essentially of a mass of organic bonding material having abrading or polishing particles distributed therethrough. A further object of the invention is the provision of methods of manufacturing such articles.

The method of the invention consists essentially in first preparing a suspension of finely divided particles in a liquid which is adapted to be solidified to form a mass of organic material carrying finely divided polishing particles distributed uniformly in the mass. There are a number of types of liquids which can be used and the particular method employed in carrying out the invention depends specifically on the character of the liquid material employed.

I will now describe the invention by reference to a number of specific examples. It is to be understood that these examples are given for the purpose of illustrating the invention and are not intended to be limitative of the scope of the invention.

Example I 275 grams of polymerized vinyl acetate is dissolved in 825 grams of anhydrous methyl alcohol. 1240 grams of finely pulverized levigated alumina is uniformly suspended in the solution by stirring.

A catalyst consisting of 3 grams of metallic sodium reacted in 100 cc. of anhydrous methyl alcohol is stirred into the suspension uniformly and the mix is quickly poured into a mold.

In about five minutes a gel of polyvinyl alcohol with levigated alumina in suspension is formed, the polyvinyl alcohol being formed by a substitution of the OH groups of the methyl alcohol for the acetate groups of the polyvinyl acetate. Methyl acetate is formed along with the polyvinyl alcohol.

This gel is allowed to set until it has shrunk into a hard, tough block. During this drying time, which may last about thirty days or less, according to the drying conditions present, a mixture of methyl alcohol and methyl acetate exudes and may be poured off. During the latter part of the drying time the exudation is so slow that the exuded substances evaporate into the atmosphere.

The block thus formed is drilled and machined by the usual known methods and machined into the form of a wheel which will be found to be superior for certain uses such as the sharpening of razor blades.

In an alternative method the mixture is poured around a metal arbor just before the gel has set. Upon drying it is found that the arbor is firmly attached to the mass of cast material.

Example II 275 grams of polymerized vinyl acetate are dissolved in 550 grams of anhydrous methyl alcohol. 1240 grams of 400 mesh silicon carbide are stirred into the soluttion. 100 grams glycerine diluted with 100 grams methyl alcohol are slowly stirred in.

A catalyst consisting of 3 grams metallic sodium reacted in 100 cc. of anhydrous methyl alcohol is stirred into the suspension. A gel quickly formed from which the volatile methyl alcohol and methyl acetate evaporated, leaving the glycerin as a plasticizer for the polyvinyl alcohol. After drying until the alcohol odor is absent, this mass is tough and leathery. Thin slices are flexible and very suitable for hand polishing brass and other metals.

The polyvinyl alcohol gels may be modified by incorporating heat hardenable phenolic resin dissolved in methanol in the methanol solution of polyvinyl acetate. A sodium methylate catalyst may be used to cause gel formation. The presence of the phenolic resin slows the reaction at room temperature. The reaction, however, may be speeded by refluxing the mixture until the gel formation starts and the mixture may then be poured into suitable molds for the completion of the gel formation. The resulting gel with abrasive in suspension may be dried and baked to harden the mixture. The phenolic resin in the gel after baking hardens and insolubilizes it.

While the use of very fine abrasives has been illustrated in the examples, this invention is in no way limited to the use of very finely divided material. Coarser abrasives may be used but it is desirable to thicken the viscosity of the solution and solidify the solution quickly to prevent settling of the abrasive.

Other modifications employed in the manufacture of abrasive products may also be employed. Such modifications include the use of modifying agents to alter the characteristics of the organic material. Such modifying agents include, for example, plasticizing agents to increase the elasticity of the bond and filling materials. Insolubilizing treatments such as the inclusion of compatible insolubilizing agents to the mix or treatment after gelation as by exposure to the fumes of a volatile aldehyde may also be employed.

Abrasive products made in accordance with the invention have been found to be particularly well adapted for polishing operations such as the final finishing of safety razor blades or steel rolls used in the final rolling of sheet materials.

While I have illustrated the invention by reference to a number of specific examples, it is to be understood that the invention is not limited to the materials and methods therein described but may be otherwise practiced as defined by the appended claims.

I claim:

1. In a method of making abrasive articles, the steps which comprise preparing a suspension of abrasive particles in a solution of a polyvinyl ester in an alcohol and adding a catalyst to cause reaction between the alcohol and the ester, whereby there is formed a solid mass of polyvinyl alcohol containing abrasive particles suspended therein and distributed uniformly therethrough.

2. The method of making an abrasive article consisting essentially of a binder and an abrasive material which comprises suspending finely pulverized abrasive material in a solution of polymerized vinyl acetate in an alcohol and adding a catalyst to cause a reaction whereby there is formed a dense solid mass of polyvinyl alcohol carrying the abrasive material uniformly distributed therethrough.

3. A method of making abrasive articles which comprises the steps of dissolving polymerized vinyl acetate in anhydrous methyl alcohol, stirring finely pulverized levigated alumina into the solution thus formed, adding to the solution a catalyst consisting of metallic sodium reacted in anhydrous methyl alcohol, and allowing the mixture to set until a polyvinyl alcohol gel thus formed has hardened.

4. method of making abrasive articles comprising the steps of dissolving polymerized vinyl acetate in anhydrous methyl alcohol, stirring finely pulverized abrasive into the solution thus formed, and adding a catalyst to cause a reaction and thus form a gel of polyvinyl alcohol, with the abrasive particles uniformly suspended therein.

NORMAN P. ROBIE.